United States Patent
Brazil

(10) Patent No.: US 7,234,987 B1
(45) Date of Patent: Jun. 26, 2007

(54) GAME CALL HOLDING DEVICE

(76) Inventor: Paul A. Brazil, 27168 Bauer Rd., Winona, MN (US) 55987

( * ) Notice: Subject to any disclaimer, the term of this patent is extended or adjusted under 35 U.S.C. 154(b) by 39 days.

(21) Appl. No.: 11/034,542

(22) Filed: Jan. 12, 2005

(51) Int. Cl.
    A63H 33/40 (2006.01)
(52) U.S. Cl. ............. 446/202; 446/204; 446/207; 224/219
(58) Field of Classification Search ........ 446/202–209; 224/219, 221, 267
    See application file for complete search history.

(56) References Cited

U.S. PATENT DOCUMENTS

| 4,218,845 | A |   | 8/1980  | Evans et al. |         |
|-----------|---|---|---------|--------------|---------|
| 4,733,808 | A | * | 3/1988  | Turner et al. | 224/219 |
| 5,035,390 | A |   | 7/1991  | Sanders      |         |
| 5,111,981 | A | * | 5/1992  | Allen        | 224/620 |
| 5,217,294 | A | * | 6/1993  | Liston       | 362/105 |
| 5,431,590 | A |   | 7/1995  | Abbas        |         |
| 5,555,664 | A |   | 9/1996  | Shockley     |         |
| 5,613,891 | A |   | 3/1997  | Lamo         |         |
| 5,820,000 | A | * | 10/1998 | Timberlake et al. | 224/219 |
| 5,988,469 | A |   | 11/1999 | Musacchia    |         |
| 6,514,116 | B2 |  | 2/2003  | Abbas        |         |
| 2001/0018311 | A1 | | 8/2001 | Musacchia    |         |

* cited by examiner

Primary Examiner—Kien Nguyen
(74) Attorney, Agent, or Firm—M. Paul Hendrickson

(57) ABSTRACT

The present invention relates to a game calling holder which when combined with a game calling unit and secured to a hunter's body at a predetermined aiming mount position will allow the hunter to simultaneously call the game while aiming the weapon. The game calling holder may appropriately include an elastic sleeve sized to elastically conform to the game calling unit configuration and a badge pin which retains the elastic sleeve and game calling unit in longitudinal alignment with the badge pin alignment when mounted onto a hunter's garment at a predetermined aiming mount position. The game calling holder when mounted appropriately to an aiming arm of a bow and arrow hunter and a triggering wrist of a firearm hunter accordingly allows the hunter to simultaneously aim and call the hunted prey.

6 Claims, 4 Drawing Sheets

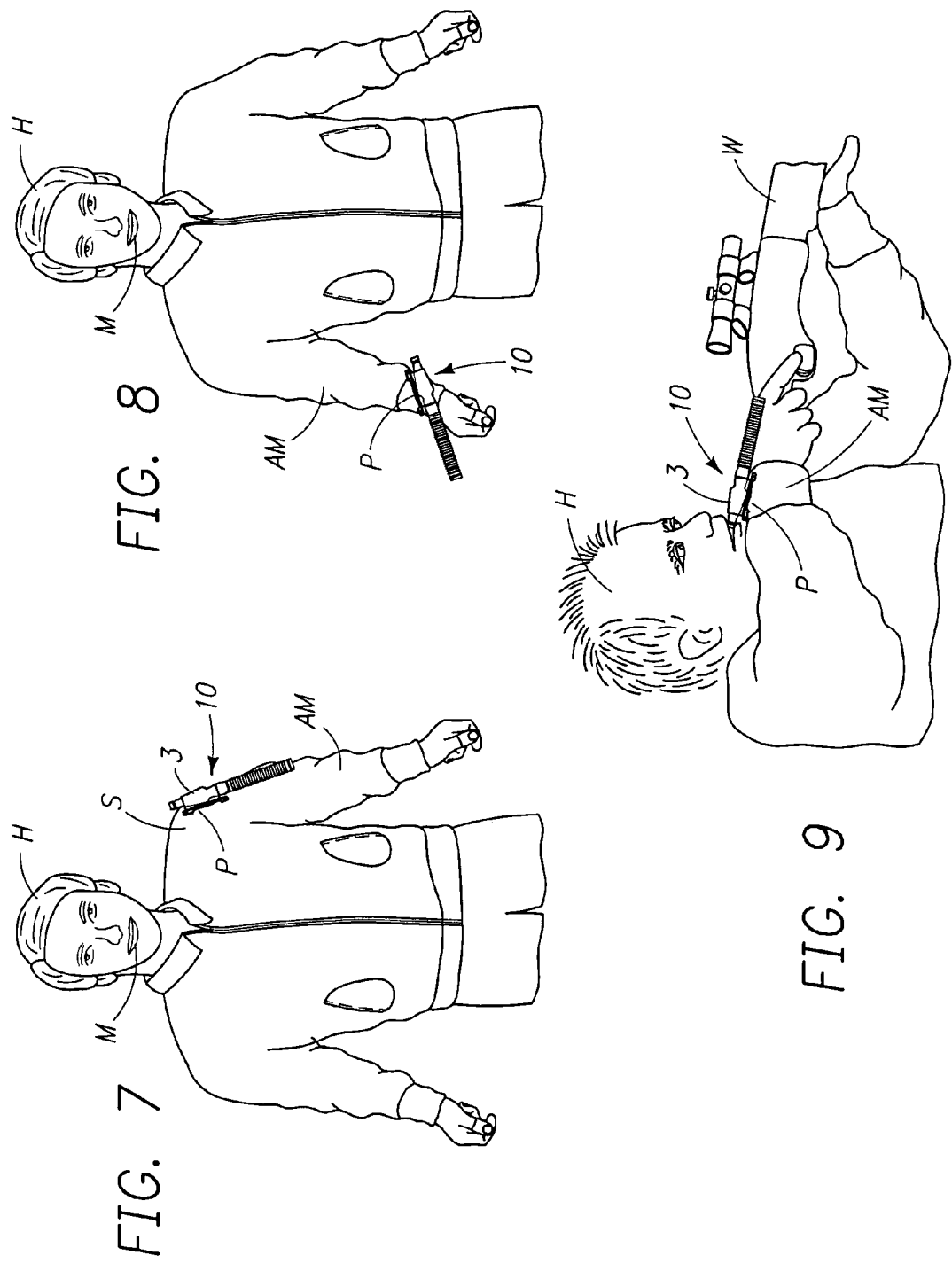

GAME CALL HOLDING DEVICE

FIELD OF THE INVENTION

The present invention relates to hunting accessories and more particularly to an animal calling device for use by game hunters.

BACKGROUND OF THE INVENTION

It is conventional for game hunters to use game callers to call prey. Air activated game callers by mouthing (vacuum or air blown) the game caller by the hunter have been used for decades to call hunted game. Most game callers are designed to be hand held when used to call prey even though some are also designed to be clinched between the hunter's teeth if desired. Game callers, such as frequently used in hunting water fowl hunters, may be hand held or mouthed by clinching the duck caller between one's teeth to call the hunted waterfowl while somewhat awkwardly aiming a firearm at the prey. Game calling for a bow and arrow hunter is even more difficult. The manner in which a bow and arrow is placed in a targeting position does not permit a bow hunter such a simultaneous use of the game caller. It would be particularly advantageous (especially for bow and arrow hunters) to be able to simultaneously aim the arrow at the prey while calling the prey such as a deer. Currently, this is a tedious if not almost impossible task to perform with existing technology.

Except for the mouth held calling devices, most animal or prey calling devices must be operated independently of the weapon. Consequently, the normal use of hand held animal calling devices is to initially call the hunted prey (e.g. animal or bird) and then dispense with the prey calling device while aiming the weapon at the targeted prey. Many prey calling devices are equipped with a lanyard which allows the hunter to grasp the prey calling device when calling the prey and then drop the hung device about the neck when aiming the weapon at the targeted prey. The problem of being able to call the prey while aiming or targeting the animal or bird prey is further compounded when a bow and arrow is used as the weapon. Conventional lanyard hung calling devices can become a lethal hunting hazard if it becomes entangled in the released bow strings. Placement of the calling device further removed from the hunter's mouth can create excessive movement which often alarms the called prey.

Prey calling devices are also manufactured in various different shapes and forms. It would be particularly advantageous if there existed a more universal holder which would hold or retain a vast majority of the prey calling devices while also enabling the hunter to aim at the targeted prey while still maintaining a call to the prey. Further benefits would be achieved if the prey calling device could be emplaced upon the hunter at a position requiring a minimum amount of movement to activate the prey calling device so as to thereby alleviate potential spooking of the prey.

Certain body-mounted game callers have heretofore been proposed such as U.S. Pat. No. 6,514,116 B2 to Abbas which discloses a vacuum activated game caller which includes a garment mounted caller for mounting to a mid-section of a wearer's garment and a long air tube mounted onto the wearer's lapel. The patented Abbas game caller system is tailor made to only apply to a specially designed game caller and calling apparatus. The long, circuitous and small air tubes of the Abbas game calling apparatus further limits its usefulness to the Abbas system. Other game animal callers include a caller mounted to a bow or firearm (e.g. see U.S. Pat. No. 5,035,390 to Sanders and U.S. Pat. No. 5,431,590 to Abbas), a bellowed foot pouch (e.g. see U.S. Pat. No. 5,613,891 to Lamo), a belt or thigh mounted turkey call of U.S. Pat. No. 5,988,469 to Musacchina and clanging antler horns suspended from a deer stand as disclosed in U.S. Pat. No. 5,555,664 to Shockley.

It would be desirable to be able to position an air activated prey caller so that it could be used to simultaneously call the prey while also taking aim at the called prey with a weapon. This would be particularly useful for bow and arrow hunters since it would enable the hunter to concentrate upon aiming at the targeted prey while manipulating the bow and arrow to the targeting position. The fluid movement required for an accurate bow aim would not then be disrupted by the prey calling. It would be even more desirable if the game hunter would not need to hold or gain hand held access to the prey caller until it was time to use the prey caller. Since hunted prey typically possess extraordinary instincts to perceive motion or sense motion danger especially by movements of a hunter, a game calling device which would provide ready access to the prey hunter for the prey calling while requiring minimal movement to engage the call would be highly advantageous in order to avoid potential spooking of the hunted prey. A game call holding device which would firmly retain the prey caller at the precise position needed to sound the prey call but yet allow the game hunter full freedom to draw an arrow, aim and discharge the arrow at the prey while easily or continuously calling the hunted prey would fulfill a long felt need. A game call holding device which would enable the game hunter to blow or suck a required volume of air directly into the game caller while simultaneously drawing aim at a targeted prey would also be particularly useful to bow and arrow deer hunters. A prey calling holder adapted to fit most prey callers and mountable upon an aiming shoulder in juxtaposition to the hunter's mouth would enable the hunter to call prey while targeting prey with most prey calling devices.

SUMMARY OF THE INVENTION

The present invention provides a mountable game or prey caller holder which when mounted to an upper torso area of a bow and arrow game hunter (particularly within the vicinity of the aiming shoulder) and the triggering wrist of a firearm hunter affords ready access to the game hunter for mouthing the game caller while targeting the hunted prey. By positioning the game caller within an elastic sleeve mountable to body portion within radial accessibility to a prey hunter's mouth, the game or prey hunter may simultaneously fire the weapon while also calling (with the prey caller) to maintaining the attention of the hunted prey. When used by a bow and arrow hunter, the prey or game calling holding device affords a means of mounting the prey caller about an aiming shoulder region of the hunter within reachable neck movement distance of a hunter's mouth so that the hunter may then simultaneously easily sound the caller and aim the arrow at the prey. The positioning of the game caller may be placed so it becomes laterally aligned along a substantially parallel axis with the aimed arrow thereby allowing the hunter to concentrate upon the target.

The mountable game holder comprises an elastic sleeve for universally holding a wide variety game or prey callers preferably adapted to hold the prey caller along the major longitudinal axis of the game calling instrument. The elastic sleeve is fitted with a mounting member (such as badge pin sewn onto the longitudinal axis of the sleeve) for mounting the sleeved game caller at a predetermined aiming position relative to the game hunter's mouth, preferably for mounting onto a uniform or shirt worn by the game hunter about the hunter's aiming shoulder region. The game calling assembly is mounted onto an appendage of a hunter so that when the hunter places the weapon in an aiming position, the calling assembly will align onto the hunter's mouth without disturbing the hunter's aim. The placement of the mounting member for a bow and arrow hunter will typically be in a frontal area of an upper arm of an aiming arm of a game hunter slightly below the shoulder joint. The aiming arm position primarily depends upon whether the hunter is left or right handed. Right handed bow hunters will most suitably place the mounting member at an oblique or downwardly and outwardly upper arm mounted position (slightly below the aiming shoulder joint) so that the calling assembly becomes aligned with the target prey when the arrow is at a fully drawn position. Left handed bow hunters would correspondingly place the mounting member at a right upper arm position (slightly below the aiming shoulder joint). When placed properly upon the upper arm region of the game hunter, the game hunter may then simultaneously draw an arrow onto a hunted game or prey while luring or attracting the hunted game towards the target area with the prey caller. The shoulder joint serves as a pivotal point about which the game calling assembly pivots when the bow hunter brings an arrow to an aiming position.

The present invention is particularly well suited to be used by bow and arrow deer hunters who would like to be able to call the hunted game with deer calling instruments such as a grunt call while manipulating the bow and arrow without interruption to a killing position.

BRIEF DESCRIPTION OF THE DRAWINGS

FIG. 7 depicts a frontal view of the game hunter shown in FIG. 5 with the game calling assembly mounted at the predetermined aiming mount position.

FIG. 8 depicts a frontal view of a firearm game hunter equipped with the game calling assembly mounted at a predetermined aiming mount positioning for a right-handed firearm game hunter.

FIG. 9 depicts the right handed game hunter of FIG. 8 positioning the firearm in an aiming position while mouthing the game calling unit.

DETAILED DESCRIPTION OF THE INVENTION

With reference to the drawings, the present invention provides a mountable holder (generally prefixed as 1) for a game caller or game calling unit (generally prefixed as 7) which when placed at a predetermined aiming mount position P upon a game hunter's arm AM allows the game hunter H to call prey with the game calling unit 7 while targeting a hunting weapon W at the prey called by game hunter H. The mountable holder 1 comprises an elastic sleeve 3 for retainingly holding the game calling unit 7 and a mounting member 5 affixed onto the elastic sleeve 3 so as to permit the game calling unit 7 to be mounted at the predetermined aiming mount position P.

Figure 5:
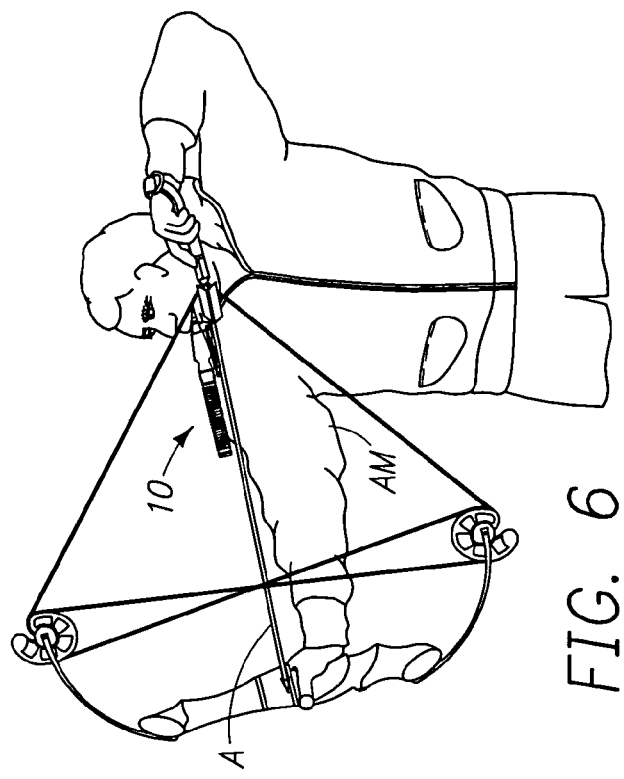
FIG. 5 depicts a right-handed game hunter equipped with the mountable game calling assembly of FIG. 1 positioned in a predetermined aiming mount position by a game hunter equipped a bow and arrow drawn to an aiming position while calling a hunted game by mouthing a game calling unit.
Figure 6:
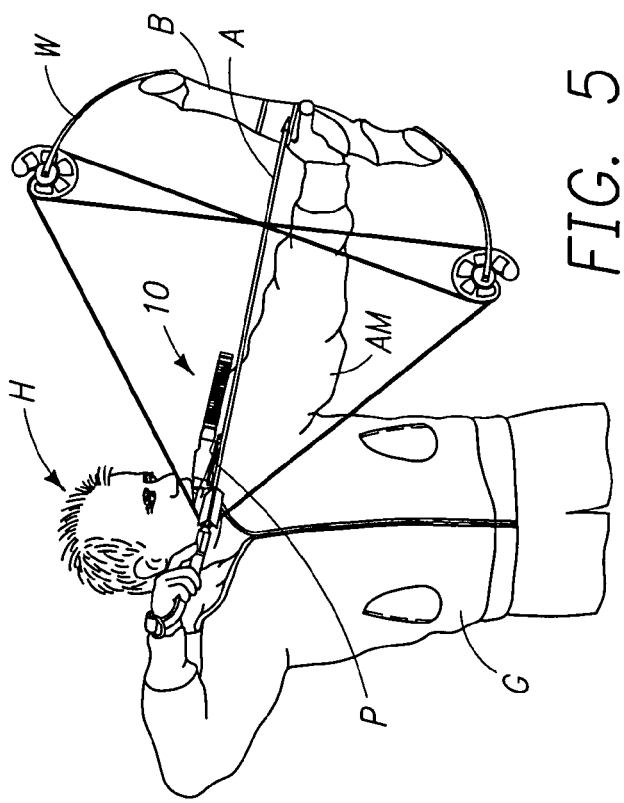
FIG. 6 depicts a side view of the game calling assembly of FIG. 1 mounted at the predetermined aiming mount position for a left-handed game hunter.

The game calling unit 7 and a mountable holder combination 1 referred herein to as the game calling assembly (referenced in general by a 10 series number) is particularly adapted for securing the game calling unit 7 to a fixed body position P (referred herein as a predetermined aiming mount position P) so as to allow a game hunter H such as a bow hunter H to simultaneously call a hunted prey while positioning a weapon W such as a bow B with a drawn arrow A in a fully drawn or aiming position as shown in FIGS. 5 and 6 or a firearm hunter H at an aiming and calling position as depicted in FIG. 9. The game calling assembly 10 consisting essentially of the game calling unit 7 for calling the game, a mountable holder 1 advantageously comprising an elastic sleeve 3 for elastically holding the game calling unit 7 in a calling position and a mounting member 5 for mounting the mountable holder 1 to a predetermined aiming mount position P so as to allow the bow hunter H or firearm hunter H to simultaneously call and aim the weapon W at the hunted game.

The present invention affords a uniquely different hunting method for calling hunted game with a unique game calling assembly 10 secured to a predetermined aiming mount position P which allows a game hunter H to manipulate a hunting weapon W to a firing position while simultaneously aiming and calling a hunted game with the game calling unit 7. The game calling assembly 10 comprises an air activated game calling unit 7 which requires forced mouthed air (vacuum or blown) by the game hunter H to sound the game calling unit 7, an elastic sleeve 3 in the most effective embodiment of the invention for holding the calling unit 7 and a mounting member 5 affixed onto the elastic sleeve 3 for mounting the game calling unit 7 at the predetermined aiming mount position P and preferably onto a cloth sleeve of a garment G worn by the game hunter H. The unique method generally comprises:

a) mounting the game calling assembly 10 with said mounting member 5 onto the garment G of the game hunter H at the predetermined aiming mount position P so as to allow the game hunter H to manipulate the hunting weapon W to an aiming position while mouthing air though the game calling unit 7 to call the hunted game;

b) manipulating the hunting weapon W to the aiming position while calling the hunted game with said game calling unit 7; and if appropriate, c) firing the hunting weapon W at the hunted game called by said game calling unit 7.

Figure 1:
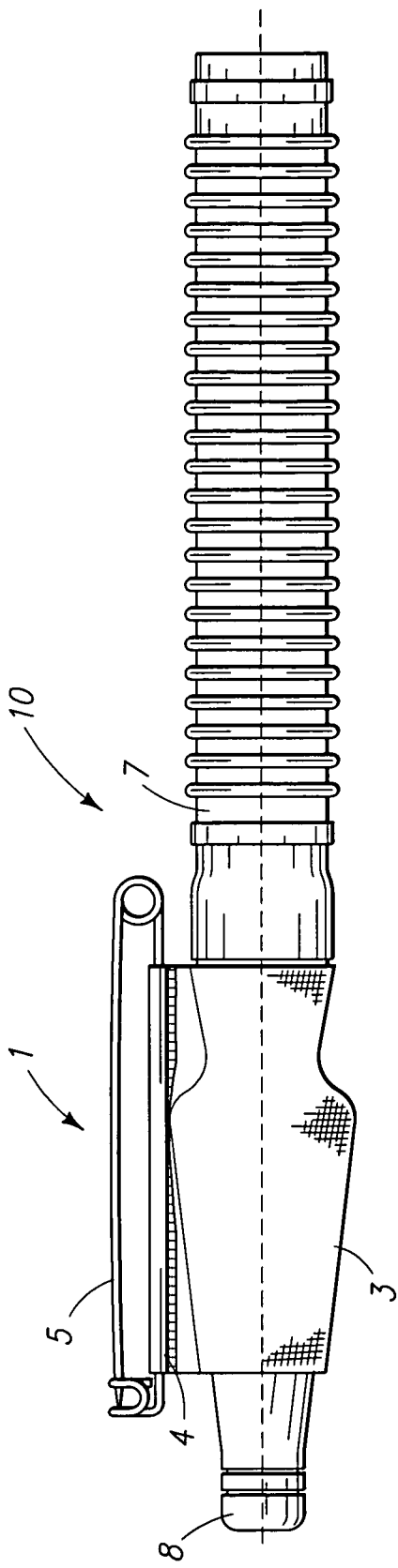
FIG. 1 is a side view of a mountable game calling assembly embodying the inventive features of this invention.
Figure 3:
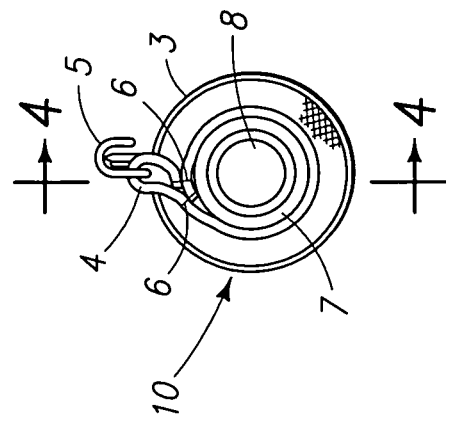
FIG. 3 is a frontal view of the mountable game calling assembly shown in FIG. 1.
Figure 2:
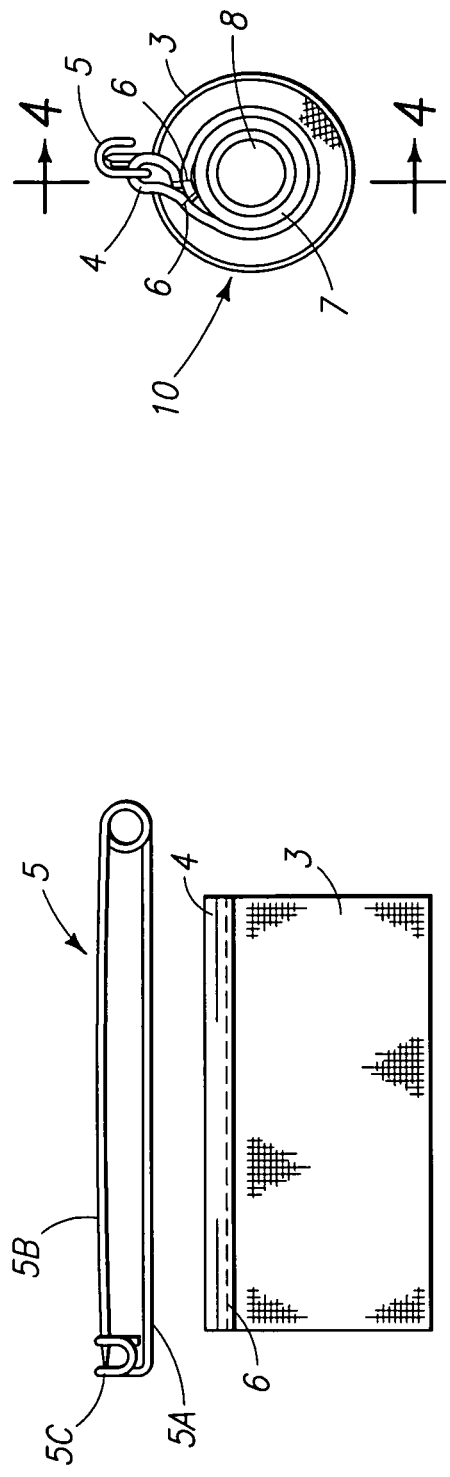
FIG. 2 is an unassembled side view depicting an elastic sleeve and a badge pin of the game calling assembly shown in FIG. 1.
Figure 4:
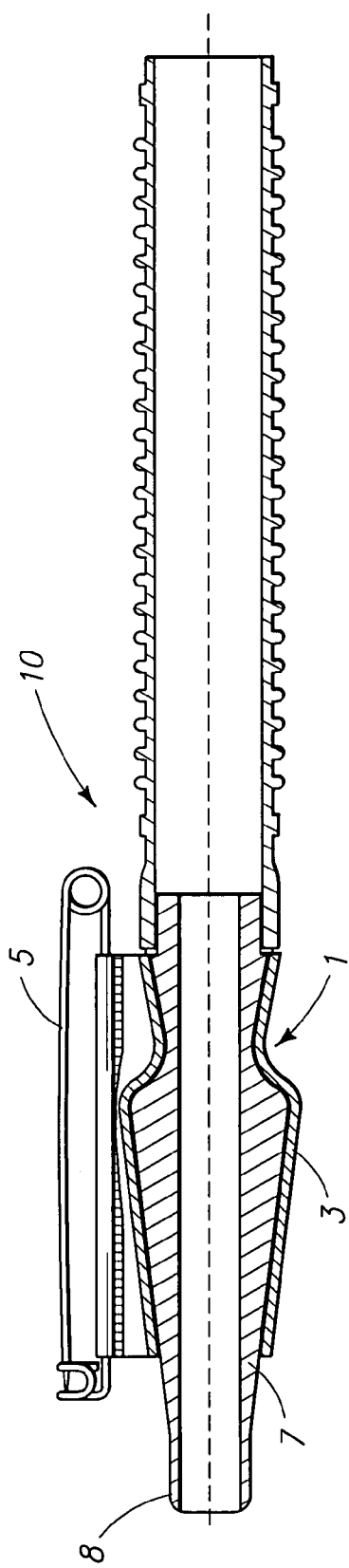
FIG. 4 is a cross-sectional view taken along line 4—4 of FIG. 3.

This unique hunting method is particularly well adapted for the use of the game calling assembly 10 (shown in FIGS. 1, 3–4) in bow and arrow hunting.

The game calling assembly 10 and its use by a hunter H minimizes a hunter's movement when calling and aiming at a prey and thus minimizes chances of spooking the prey. FIG. 5 illustrates the use of the game calling assembly 10 when secured to a predetermined aiming mount position P which allows a right handed bow and arrow hunter H to simultaneously call with the game calling unit 7 and aim the arrow A at the called prey. The appropriate body positioning at the predetermined aiming mount position P for mounting the calling assembly 10 for a right handed game hunter H is positioned upon the upper left arm or aiming arm AM (at the upper arm) in juxtaposition to the left shoulder joint S of is depicted in FIG. 7. For a left handed bow and arrow hunter H as shown in FIG. 6, the predetermined aiming mount position P would be a mirror image location of the FIG. 7 body position P but at the right upper arm AM. The predetermined aiming mount position P relies upon pivotal movement of the upper arm AM about the shoulder joint S to place the calling assembly 10 in position for aiming the upper arm AM at the target while the game calling unit 7 is positioned so as to allow for mouthing of the game calling unit 7. In the case of a firearm W, the predetermined aiming mount position P is affixed to the hunter's arm AM at the hunter's triggering wrist as illustrated in FIGS. 8 and 9.

The calling and hunting efficacy of the calling assembly 10 is significantly enhanced by the use of a mounting member 5 which positions and retains the calling assembly 10 at an aiming position when the weapon W is placed in an aiming position as illustrated in FIGS. 5–6 & 9. As may be observed from FIGS. 1–4, the securing member 5 in combination with the elastic sleeve 3 is adapted to secure the game calling unit 7 along the longitudinal axis of the game calling unit 7. Thus, when the calling assembly 10 is placed at a predetermined aiming mount position P, the mouthpiece 8 of the game calling unit 7 will be placed in an aiming position by the game hunter H while being placed directly onto the mouth M of the hunter H as illustrated by FIGS. 5–6 and 9. The predetermined aiming mount positioning of the game calling assembly 10 upon the hunter's garment G in a game calling position coincides with the aiming position of the hunter H which in turn allows the hunter H to accomplish both feats without detracting from the hunter's aim.

The term "aiming position" refers to when the weapon W is being aimed at the prey which also renders it capable of being fired at the prey. The term "a predetermined aiming mount position" P refers to placement of the game calling assembly 10 upon the hunter's person H at a position which longitudinally and simultaneously aligns the hunter's line of aiming sight to the prey and the mouthpiece 8 of the game calling unit 7 with the hunter's mouth M when the weapon W is placed in the aiming position as illustrated by FIGS. 5, 6 and 9. In contrast to a right-handed firearm hunter H depicted by FIG. 9, the predetermined aiming mount position for a left handed firearm hunter H would be on the opposite or left hand wrist of the hunter H. It may be observed in the use of a firearm W, the game calling assembly 10 is typically mounted in an oblique angular relationship to the hunter's firearm wrist which in turn places it longitudinal alignment with the hunter's mouth M and the aiming position as shown in FIG. 9.

Figure 10:
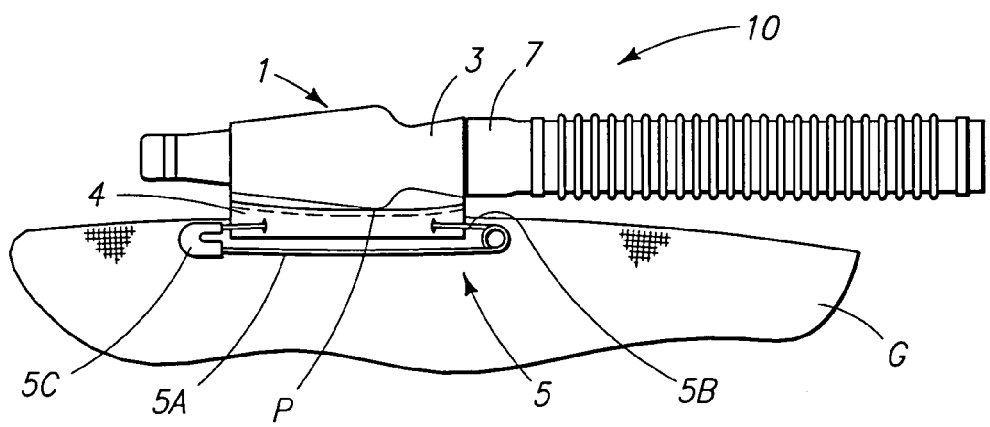
FIG. 10 is an enlarged fragmentary elevational view illustrating an alternative mounting member for mounting the mountable holder to an arm sleeve cloth piece.
Figure 11:
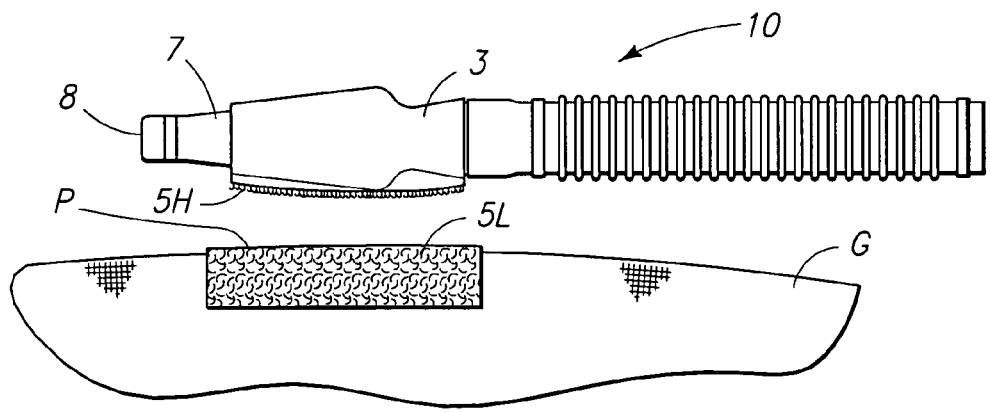
FIG. 11 is another enlarged fragmentary elevational view depicting a hook and loop fastener combination for mounting the mountable holder of the game calling assembly to a hunter's garment.
Figure 12:
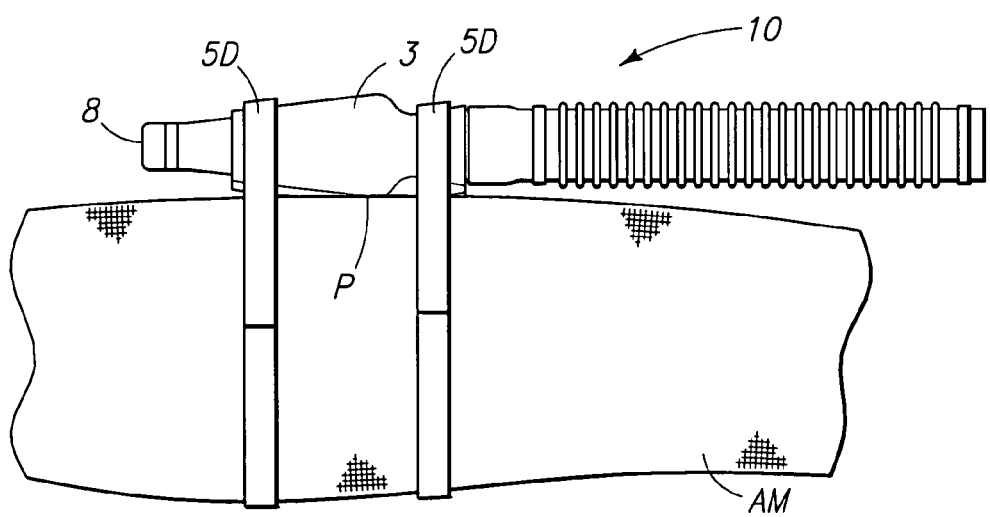
FIG. 12 depicts an enlarged fragmentary elevation view illustrating an alternative mounting of the game calling assembly to a hunter's arm.

The mounting member 5 may be any member which secures or places the game calling assembly 10 onto or about a hunting garment G of the game hunter H at the predetermined aiming mount position P. A mounting member 5 which aligns the calling unit 7 for mouthing along the same line of vision for aiming the weapon W as illustrated by FIGS. 5–6 and 9 may be most effectively utilized for this purpose. Elastic straps, mating hook 5H and loop 5L napped fasteners such as disclosed in U.S. Pat. No. 4,386,642 or commonly sold under the VELCRO trademark, attached to the garment G and elastic sleeve 3 and game calling assembly 10 as depicted by FIG. 11, straps 5D of mating hook and loop fasteners as depicted in FIG. 12, male and female snaps, pins such as the badge pin 5 of FIGS. 1–9, and the like may be utilized to secure or mount the calling assembly 10 to the hunter's garment G. Exemplary securing members 5 particularly suitable for retaining the calling unit 7 in alignment with the targeted prey include mating hook 5H and loop 5L fasteners one of which may be attached to the game calling holding member 3 and the other to the hunter's garment G as depicted by FIG. 11, elastic sleeves and badge pin 5 of FIGS. 1–9 and other elongated pins such as a safety pin 5 as shown in FIG. 10 and the like. Mounting members 5 which longitudinally align and maintain the elastic sleeve 3 in a predetermined and fixed longitudinal alignment in relationship to the hunter's sleeve G to maintain the holding assembly 10 at the desired predetermined aiming mount position P will allow the hunter H to repetitively reposition the weapon W to an aiming and calling position without fear of dislodgment of the desired mount at the predetermined aiming mount position P. A badge pin 5 in which the badge pin mounting shaft 5A is held in place by a badge pin sleeve 4 stitched lengthwise by stitched seam 6 along the elastic sleeve 3 as illustrated in FIGS. 1–4 with the latch pin 5B available for attachment to the hunter's garments G is particularly useful for this purpose.

The holding member 3 should likewise be adapted to retain the calling unit 7 in a calling position when the game hunter's weapon W is placed in an aiming position as depicted in FIGS. 5–6 and 9. The mountable holding member 3 most suitably serves a temporary holder for the calling unit 7 so as to permit the calling unit 7 to be temporarily held by the holding member 3 when in use and then removed the holding member 3 when not is use. Enveloping hook and loop fasteners may be alternatively adapted for use as a holding member 3. Elastic sleeves 3 sized to elastically conform to the size and configuration of the calling unit 7 provide enhanced efficacy in holding the game calling unit 7 at the correct alignment for mouthing the calling unit 7 while aiming the weapon W. The elastic character of the elastic sleeve 3 allows the sleeve 3 to almost universally conform to the shape and size of most calling units 7. An elastic sleeve 3 equipped with a badge pin sleeve 4 for retaining the badge pin 5 and badge pin shaft 5A in longitudinal alignment with the calling unit 7 in combination with a calling retaining elastic sleeve 3 sized for elastically retaining the calling unit 7 in longitudinal alignment therewith provides a highly effective holding combination for retaining the calling unit 7 in a precise predetermined aiming mount position P upon a hunter's person H which allows the hunter H to repetitively call the prey and fire upon aiming of the weapon W. The elongated latching pin 5B when pinned to a garment G retains the desired longitudinal positioning for retaining the mounted assembly 10 at the predetermined aiming mount position P.

The preferred elastic material for construction of the elastic sleeve 3 of this invention include elastic materials such as commonly used in the garment industry to fabricate elastic garments and elastic closures about an appendage such as about a neck, arm, leg ankle, wrist closures of the garment G. The elastic sleeves 3 should possess sufficient elasticity to stretch about the calling unit 7 and then elastically retract to firmly hold the calling unit 7 in longitudinal alignment along the major axis of the sleeve 3 so as to retain the desired predetermined aiming mount position P when affixed to the proper body mount. The elastic sleeve 3 can be made of conventional, woven, braided or knitted elastic bands sewn together to provide a badge pin holding sleeve 4 and calling unit sleeve holder 3 as illustrated particularly in FIGS. 1–4. Exemplary elastic braided or knit materials include elastic bands of a desired width such as may be obtained from South Carolina Elastic, P.O. Box 369, Landrum, S.C. 29356-0369 and EB Series knit elastic bands as advertised and sold by Sew True, 447 West 36$^{th}$ St, New York, N.Y. 10018 (www.sewtrue.com) and other similar conventional sources of elastic banded materials.

The method by using the game call assembly 10 involves attaching the game calling assembly 10 to a predetermined aiming mount position P upon the game hunter H as illustrated by FIGS. 5–9. As my be observed from the Figures, the predetermined aiming mount position P entails mounting the game calling assembly 10 upon the aiming arm for a bow and arrow hunter H and a triggering wrist for a firearm hunter H at a body mount site which places the calling unit 7 in position for mouthing or calling while the weapon W is placed at an aiming position. The aiming position will differ for a right handed and left handed bow and arrow hunters H as well as for a firearm hunters H of which the right handed predetermined aiming mount position P is illustrated. The determination of the predetermined aiming mount position P involves positioning either the bow and arrow W or firearm W in an aiming position and then attaching the game calling assembly 10 to a hunter's garment G on the aiming arm AM for a bow and arrow hunter H and the trigging wrist (also indicated as AM) for a firearm hunter H so that the game calling assembly 10 becomes positioned about the hunter's mouth M when the weapon W is placed in an aiming position as illustrated by FIGS. 5, 6 and 9. It will be observed from FIG. 7 that the predetermined aiming mount position P for a right-handed hunter H involves attaching the game calling assembly 10 upon the hunter's aiming upper arm AM slightly below the hunter's shoulder joint. The game calling assembly 10 becomes aligned parallel and laterally with the upper arm slightly forward from the outermost frontal extremity of the hunter's upper arm AM. This predetermined aiming mount position P creates a pivotal movement of the game calling assembly 10 from the resting position to the firing position as may visualized by comparing the at rest position or unaiming position of FIGS. 7 and 8 with the aiming positions depicted by FIGS. 5–6 and 9. This positioning of the badge pin 5 in combination with the elongated mounting of the game calling unit 7 within sleeve 3 longitudinally aligns the game calling unit 7 in a calling position (as shown in FIGS. 5–6 and 9) with the hunter mouth M as well as in alignment with the bow hunter's sight or aiming sight when the bow B and arrow A is drawn in an aiming or firing position. The mirror image predetermined aiming mount position P of game calling assembly 10 is utilized for a left-handed bow and arrow hunter H as depicted in FIG. 6.

The same predetermined aiming mount positioning P of the game calling unit 7 applies to the mounting of the game calling assembly 10 to the wrist of a right handed or left handed firearm hunter H as may be observed from FIGS. 8–9. Ascertaining the predetermined aiming mount position P may be determined simply by aiming the firearm W and then attaching the game calling assembly 10 to the triggering arm AM of the hunter's wrist AM so that the hunter H may simultaneously aim at and call the prey. The left handed predetermined aiming mount P is the mirror image of the right-handed predetermined aiming mount position. With repetitive experience, the hunter H will be automatically able to attach the game calling assembly 10 at the corrected predetermined aiming mount position P without having to place the weapon W in an aiming and mouthing position to determine the correct predetermined aiming mount position P upon the sleeve of the hunter's garment G.

The following Example is illustrative of the invention:

EXAMPLE 1

The elastic portion of a holding member 3 suitable for a conventional deer grunt caller 7 such as one sold under the trademark Power Buck & Doe by Primos, 604 First Street, Flora, Miss. 39071, was fabricated from a three inch wide braided knit elastic band sold as #EB300 by Sew True, of 447 West 36$^{th}$ St, New York, N.Y. 10018 (www.sewtrue-.com). This elastic sleeve 3 as fabricated herein may be generally adapted to hold most conventional grunt calling units 7. The three inch braided elastic band was cut to a three and one-half inch length from which the elastic sleeve 3 was made by initially folding the 3×3½ inch elastic band lengthwise onto itself to provide double fold in which the freshly cut edge was then mated and cornered onto original braided band edge. The two loose ends of the mated and cornered elastic braid band were then surged sewn together by about a ¼ inch surge sewn stitch 6 as may be observed by FIG. 3 to provide an unfinished sleeve. The surge stitched unfinished sleeve was then turned inside out to provide the basic shell for elastic sleeve 3 and the badge pin mounting shaft sleeve 4 together. The sleeve 3 was then flattened to provide a lower sleeve portion overlapped by a mating upper sleeve portion. A badge pin 5 (as illustrated in FIGS. 1–4) was then placed in juxtaposition to the initial surge sewn stitch and a straight stitch 6 abutting onto the badge pin mounting shaft 5A was made to provide the badge pin sleeve 4 with the badge pin mounting shaft 5A snuggly secured therewithin resting in longitudinal alignment with the major longitudinal axis of the elastic sleeve 3. The badge pinning shaft 5A of the badge pin 5 was accordingly properly positioned for properly mounting the game calling assembly 10 to sleeved arm AM of a garment G worn by a game hunter H as depicted in FIGS. 5–9

The predetermined aiming mount position P for placing the game calling assembly 1 in a position upon a hunter's garment G so as to allow the bow and arrow hunter H to simultaneously call and aim the arrow A at a hunted prey was initially determined by drawing the bow B and arrow A to a fully drawn and aiming position as illustrated in FIG. 5 for a right handed hunter H and FIG. 6 for a left handed hunter H and then by pinning the badge pin 5 at the appropriate mounting position upon the aiming arm sleeve of the garment G as more particularly further illustrated by FIG. 7 for a right-handed bow and arrow hunter H and at an identical but opposite aiming positioning for a left-handed bow and arrow hunter H. When the bow B and arrow A is placed in the appropriate body mount positioning by a pinning of the badge pin mounting shaft 5A to the garment G upon the upper arm garment sleeve slightly below the shoulder joints of the hunter H as depicted in FIG. 7, the mouth piece 8 of the grunt caller 7 will then be placed in direct alignment with the hunter's mouth M and a line of aiming sight when the arrow A is placed in an aiming position.

Once the hunter H has determined the predetermined aiming mount position P upon the aiming arm AM of the hunter H so that the grunt calling unit 7 may be sounded while aiming the bow and arrow B & A, the hunter H may simply leave the badge pin 5 with the entire game calling assembly 10 attached to the garment G or just the game calling holder 1 attached to the hunter's garment G or alternatively reinserting the game calling holder 1 at the appropriate mounting site when latter needed.

The same predetermined aiming mount position P apply when the game calling assembly 1 is used by a firearm game hunter H for right handed firearm hunter H as illustrated by FIGS. 8 and 9. As illustrated by FIGS. 8 and 9, the badge pin 5 is mounted onto a wrist portion of the hunter's garment G at a mounting position which places the game calling mouthpiece 8 in alignment with the hunter's mouth M while the firearm weapon W is placed in an aiming position at a targeted prey as illustrated by FIG. 9. This establishes the predetermined aiming mount position P for the right-handed firearm hunter H. A left-handed hunter H simply places the game calling assembly 10 upon the opposite wrist area AM (i.e. arm mount) of the garment G so as to provide the desired predetermined aiming mount position P which allows the hunter H to simultaneously call with the grunt calling unit 7 while aiming the weapon at the prey.

The game holder 1 and game calling assembly 10 will most suitably maintain the game calling unit 7 long a longitudinal axis as the hunter moves his arms AM from a relaxed to an aiming position. The badge pin 5 in cooperation with the badge pin sleeve 4 and elastic sleeve 3 collectively maintain the game calling assembly 10 and the game calling unit 7 in longitudinal alignment with the positioning of the hunter's arm AM. The badge pin 5 being pinned onto the hunter's garment G will maintain its longitudinal positioning as well as the game calling holder 1 and game calling unit 7 of the game calling assembly 10 in the desired longitudinal positing for calling, aiming and firing the weapon W at the prey. If other securing members 5 are used to secure the game calling assembly 10 to a hunter's arm or sleeve AM, the securing member 5 will advantageously secure and maintain the calling assembly 10 in a similar longitudinal alignment to the position it is mounted upon the hunter's aiming or triggering arm AM.

What is claimed is:

1. A method for calling hunted game with a game calling assembly secured to an upper arm clothing sleeve garment worn by a game hunter at a predetermined aiming mount position which allows the game hunter to repetitively manipulate a hunting weapon to an aiming position and call a hunted game with the game calling assembly at the aiming position, said game calling assembly consisting essentially of an air activated game calling unit which requires forced mouthed air by the game hunter to sound the game calling unit, a holding member for holding the calling unit at the predetermined aiming mount position and a mounting member for longitudinally mounting and aligning the game calling unit at the predetermined aiming mount position, said method comprising:

a) mounting said mounting member of the game calling assembly onto the upper arm clothing sleeve garment worn by the game hunter at the predetermined aiming mount position so as to allow the game hunter to repetitively manipulate the hunting weapon to the aiming position and mouth an air flow though the game calling unit to call the hunted game; and
   b) manipulating the hunting weapon to the predetermined aiming mount position so as to allow the game hunter to mouth an air flow through said game calling unit; and
   c) calling the hunted game with said game calling unit while aiming onto the hunted game at the predetermined aiming mount position.

2. The method according to claim 1 wherein the holding member comprises an elongated elastic sleeve and the mounting member comprises a mountable mounting member for longitudinally mounting the game calling assembly to the upper arm sleeve garment and the mounting includes aiming the weapon while placing the game calling unit in a mouthing position so as to establish the predetermined aiming mount position for the mounting of the game calling assembly onto the upper arm clothing sleeve garment.

3. The method according to claim 2 which includes an additional step of removing the game calling unit from the elastic sleeve.

4. The method according to claim 2 wherein the weapon comprises a bow and arrow and the mounting includes the mounting of the game calling assembly at the predetermined aiming mount position upon an upper arm area of an aiming arm sleeve of the garment worn by a bow and arrow hunter.

5. The method according to claim 4 wherein the mounting member comprises a badge pin longitudinally attached to the elastic sleeve and the mounting consists essentially of pining the game calling assembly at the predetermined aiming mount position.

6. The method according to claim 4 wherein the mounting member comprises a hook and loop fastener combination and the method includes the mounting of one member of the hook and loop fastener combination upon an aiming arm sleeve of the bow and arrow hunter at the predetermined aiming mount portion position and securing another member of the hook and loop combination onto the elastic sleeve.

* * * * *